UNITED STATES PATENT OFFICE.

CASPAR W. METTLER AND ADOLF METTLER, OF HARTFORD, CONNECTICUT, ASSIGNORS TO JOSEPH DART AND FRED W. DART, OF SAME PLACE, AND FREDERICK C. ROCKWELL, OF WEST HARTFORD, CONNECTICUT.

COMPOSITION OF MATTER FOR FIRE-KINDLERS.

SPECIFICATION forming part of Letters Patent No. 678,346, dated July 9, 1901.

Application filed March 17, 1900. Serial No. 9,024. (No specimens.)

*To all whom it may concern:*

Be it known that we, CASPAR W. METTLER and ADOLF METTLER, citizens of the United States of America, residing and having post-office address at Hartford, in the county of Hartford and State of Connecticut, have invented a certain new and useful Improvement in Compositions of Matter for Fire-Kindlers, of which the following is a description.

This invention relates to a certain new and useful composition of matter especially adapted to be used as a fire-kindler.

Our composition consists of comminuted wood, petroleum-tar, starch, molasses, comminuted coke, and powdered soft coal.

The composition is formed in the following manner: Wood in a suitable degree of comminution or fineness, preferably in the condition of sawdust and of a readily inflammable nature, is saturated with petroleum-tar. The saturation is accomplished by thoroughly coating the wood with the tar and then letting it stand until the tar is absorbed. The saturated wood is then intimately and thoroughly intermixed with the comminuted coke and powdered soft coal. After the thorough intermixing of the wood, coke, and coal a composition consisting of starch and hot water having ten per cent. of molasses is added thereto until the whole is a glutinous mass. Care should be taken that the composition is equally and thoroughly intermingled in the mass, and the purpose thereof is to hold the same together after being molded until it is put to its final use as a kindler. The mass formed as hereinbefore described is then molded in any approved manner and of any desired shape; but we prefer the same to be brought to a tubular shape. This is accomplished, preferably, by molding under pressure, the pressure being such as not to entirely close the pores which the mass will possess.

The composition of the starch, hot water, and molasses will not act to hold the mass together after molded until the same is wholly consumed when used to kindle a fire; but such purpose is thoroughly effected by the soft coal combining with the starchy composition, the latter being the main or primary binder of the mass until the burning is under way, and the soft coal combines with the starchy composition and acts as a secondary binder until the mass is entirely consumed.

The preferred form of molding the mass in tubular shape is of special utility. To make the composition available for kindling purposes, its thickness in its molded form must be so small that in any other than tubular it cannot maintain that form against breakage. The ingredients of the composition are not pressed as closely together but that the air may pass through the pores or interstices. To maintain the thinness of the mass when molded requisite to that end with the necessary degree of strength, the tubular form is necessary. Furthermore, the opening formed through the kindler when molded in tubular form will permit and facilitate the passage of air, flame, and draft, and it is thought the many advantages of our composition for use as a fire-kindler can be readily understood from the foregoing description.

Having thus fully described our invention, what we claim as new, and desire to secure by Letters Patent, is—

1. A composition of matter for a fire-kindler, consisting of wood, petroleum-tar, starch, molasses, coke and soft coal.

2. A composition of matter for a fire-kindler, consisting of comminuted wood, petroleum-tar, starch, molasses, comminuted coke, and powdered soft coal.

3. A composition of matter for a fire-kindler consisting of wood, petroleum-tar, coke and a binder therefor comprising starch, molasses and soft coal.

4. A composition of matter for a fire-kindler consisting of comminuted wood, petroleum-tar, comminuted coke, a primary binder therefor comprising starch and molasses, and a secondary binder consisting of powdered soft coal combining with the said starch.

CASPAR W. METTLER.
ADOLF METTLER.

Witnesses:
W. E. SIMONDS,
LUITGARD MORLA.